United States Patent
Crabtree

(10) Patent No.: US 6,902,155 B1
(45) Date of Patent: Jun. 7, 2005

(54) AIR SPRING ELLIPTICAL PISTON

(75) Inventor: Michael L. Crabtree, Arvada, CO (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 4 days.

(21) Appl. No.: 10/666,651

(22) Filed: Sep. 17, 2003

Related U.S. Application Data

(60) Provisional application No. 60/412,472, filed on Sep. 20, 2002.

(51) Int. Cl.[7] ............................................. F16F 9/04
(52) U.S. Cl. ........................... 267/64.24; 267/64.21; 267/64.27
(58) Field of Search ................... 267/64.11, 64.15, 267/64.21, 64.23, 64.24, 64.27

(56) References Cited

U.S. PATENT DOCUMENTS

| | | | |
|---|---|---|---|
| 3,351,337 A * | 11/1967 | Nishioka et al. | 267/64.24 |
| 4,688,774 A | 8/1987 | Warmuth, II | 267/64.21 |
| 4,854,557 A | 8/1989 | Goshima et al. | 267/64.27 |
| 4,911,416 A | 3/1990 | Warmuth, II | 267/64.24 |
| 5,129,634 A | 7/1992 | Harris | 267/64.24 |
| 5,180,144 A | 1/1993 | Hellyer et al. | 267/64.19 |
| 5,752,692 A | 5/1998 | Crabtree et al. | 267/64.24 |
| 6,585,239 B2 | 7/2003 | Eichhorn et al. | 267/64.24 |

FOREIGN PATENT DOCUMENTS

| | | | |
|---|---|---|---|
| CA | 2065946 | 7/1993 | F16F 9/05 |
| DE | 1150889 | 6/1963 | |
| DE | 196 42 024 | 4/1998 | F16F 9/05 |
| JP | 56143832 | 11/1981 | F16F 9/02 |

* cited by examiner

*Primary Examiner*—Robert A. Siconolfi
*Assistant Examiner*—Bradley King
(74) *Attorney, Agent, or Firm*—Jeffrey Thurnau; Ronald W. Wangerow

(57) ABSTRACT

A side load compensating air spring piston having an elliptical cross-section. The side load compensating air spring comprises an air spring sleeve forming a chamber and having a rolling lobe. One end of the sleeve is attached to a tilted end cap for side load compensation. The other end of the sleeve has a rolling lobe engaged with a piston elliptical outer surface. The piston elliptical outer surface is disposed at a 90° angle to an elliptical stress distribution in the sleeve, thereby rendering the stress distribution uniform in the sleeve rolling lobe portion as it rolls on the piston.

2 Claims, 2 Drawing Sheets

AIR SPRING ELLIPTICAL PISTON

REFERENCE TO RELATED APPLICATIONS

This application claims priority from U.S. provisional application Ser. No. 60/412,472 filed Sep. 20, 2002.

FIELD OF THE INVENTION

The invention relates to an air spring and more particularly, to an air spring having a piston with an elliptical outer surface to cause a uniform stress distribution in an air spring sleeve.

BACKGROUND OF THE INVENTION

Compression and extension of a rolling lobe air spring causes fatiguing damage to the air spring sleeve. The damage accumulates over the life of the air spring until failure of the sleeve occurs. The distribution of stress in the sleeve is an important factor in the durability of the sleeve. When the stress is uniform around the circumference of the sleeve in the rolling lobe, the durability is maximized.

Side load compensating air springs utilize tilting the end cap of the air spring with respect to the axis of the piston/strut. This causes the stress distribution of the sleeve to become elliptical. This is a non-uniform stress distribution in comparison to the uniform stress distribution. More particularly, a stress along the x axis of the spring is different than a stress in the y axis. Further, greater end cap tilt angles for greater side load compensation result in higher non-uniform stress distribution and lower durability.

The durability of the air spring sleeve is reduced by the elliptical or non-uniform stress distribution. The more non-uniform the stress distribution, the more durability is reduced.

Representative of the art is U.S. Pat. No. 5,752,692 (1998) to Crabtree et al. which discloses a chamber portion attached to a tilted closure and a rolling lobe portion of an airsleeve attached to a piston that is transversely mounted.

The prior art air spring causes an elliptical, non-uniform stress distribution in the sleeve which shortens an operating life.

What is needed is a side-load compensating air spring piston having an elliptical cross-section. What is needed is a side-load compensating air spring having a sleeve with a substantially uniform stress distribution in a rolling lobe. The present invention meets this need.

SUMMARY OF THE INVENTION

The primary aspect of the invention is to provide a side-load compensating air spring piston having an elliptical cross-section.

Another aspect of the invention is to provide a side-load compensating air spring having a sleeve with a substantially uniform stress distribution in a rolling lobe.

Other aspects of the invention will be pointed out or made obvious by the following description of the invention and the accompanying drawings.

The invention comprises a side load compensating air spring piston having an elliptical cross-section. The side load compensating air spring comprises an air spring sleeve forming a chamber and having a rolling lobe. One end of the sleeve is attached to a tilted end cap for side load compensation. The other end of the sleeve has a rolling lobe engaged with a piston elliptical outer surface. The piston elliptical outer surface is disposed at a 90° angle to an elliptical stress distribution in the sleeve, thereby rendering the stress distribution uniform in the sleeve rolling lobe portion as it rolls on the piston.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
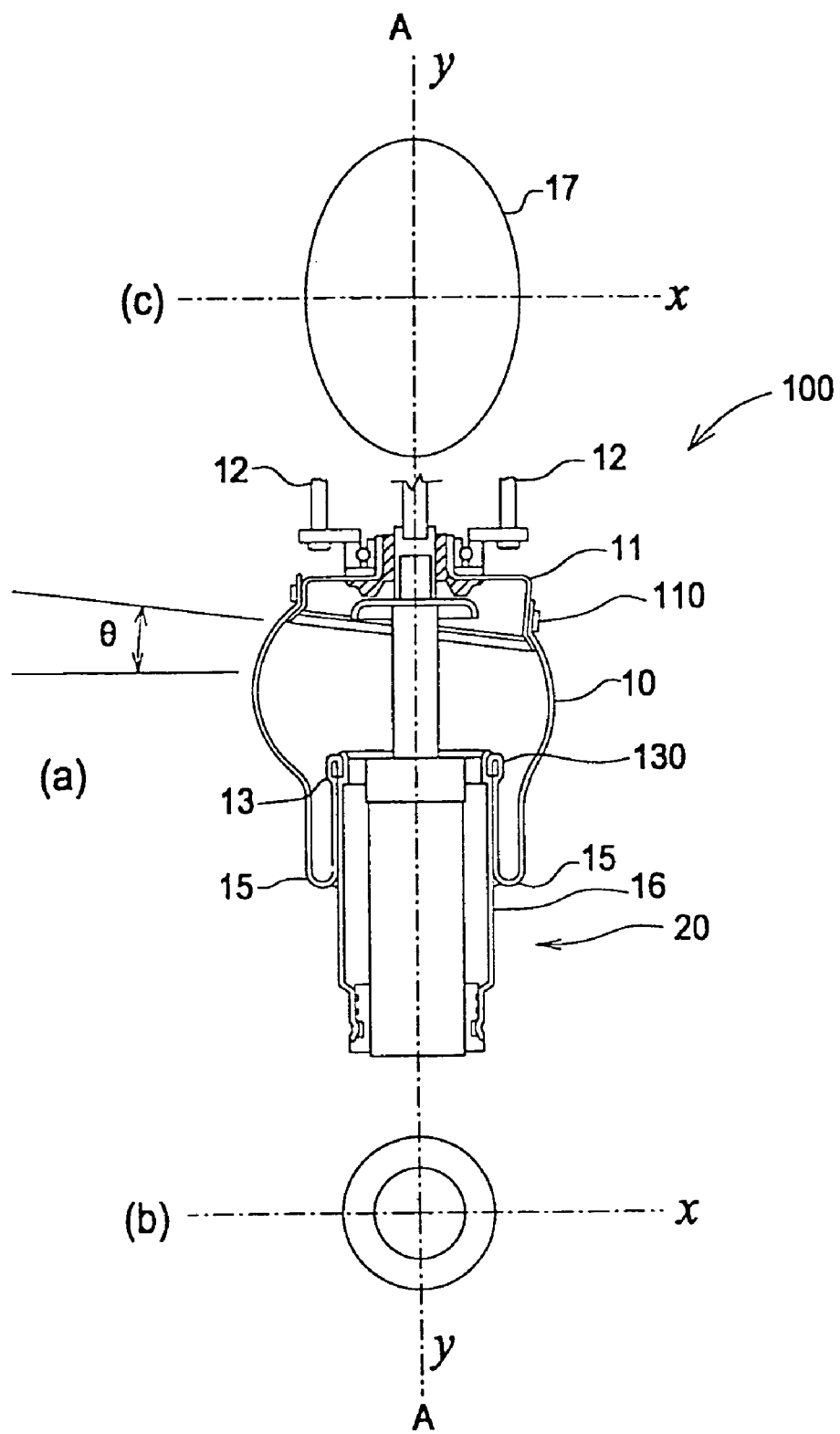
FIG. 1a is a cross-sectional view of a prior art air spring.
FIG. 1b is a plan view of a prior art piston cross-section.
FIG. 1c is a plan view of a prior art air spring sleeve stress distribution.

FIG. 1a is a cross-sectional view of a prior art air spring. Air spring 100 comprises flexible sleeve 10. Sleeve 10 is air tight and forms a chamber that is attached at one end to a tilted end cap 11. Sleeve 10 is attached to the end cap by crimp ring 110 or other suitable means known in the art. End cap 11 is round in plan. End cap 11 is tilted by angle θ to compensate for a side load imposed upon the air spring. Angle θ is the angle between an end cap plane and a normal to a piston major axis A—A. Fasteners 12, such as threaded screws, attach the air spring to a mounting bracket (not shown). Sleeve 10 is constructed of elastomeric materials and in a manner known in the art. Sleeve 10 also comprises cords wound helically within the elastomeric material. A helix angle of the helically wound cord need not be limited to a particular range in order to achieve the benefits of the instant invention.

The other end 13 of the sleeve 10 is attached to a piston 20. Sleeve 10 is attached to the piston by crimp ring or other suitable means known in the art. As piston 20 compresses and rebounds, sleeve 10 forms a rolling lobe 15 on an outer surface 16 of piston 20. Rolling lobe 15 rolls along a length of outer surface 16 of piston 20 during operation of the air spring.

FIG. 1b is a plan view of a prior art piston cross-section. Outer surface 16 has a circular cross-section. Since end cap 11 is tilted and therefore not parallel to a piston plane that is normal to a major axis, sleeve 10 has a substantially elliptical stress distribution 17. The elliptical stress distribution can manifest as wrinkles appearing on the sleeve during compression strokes which reduce an operating life.

FIG. 1c is a plan view of a prior art air spring sleeve stress distribution.

Figure 2:
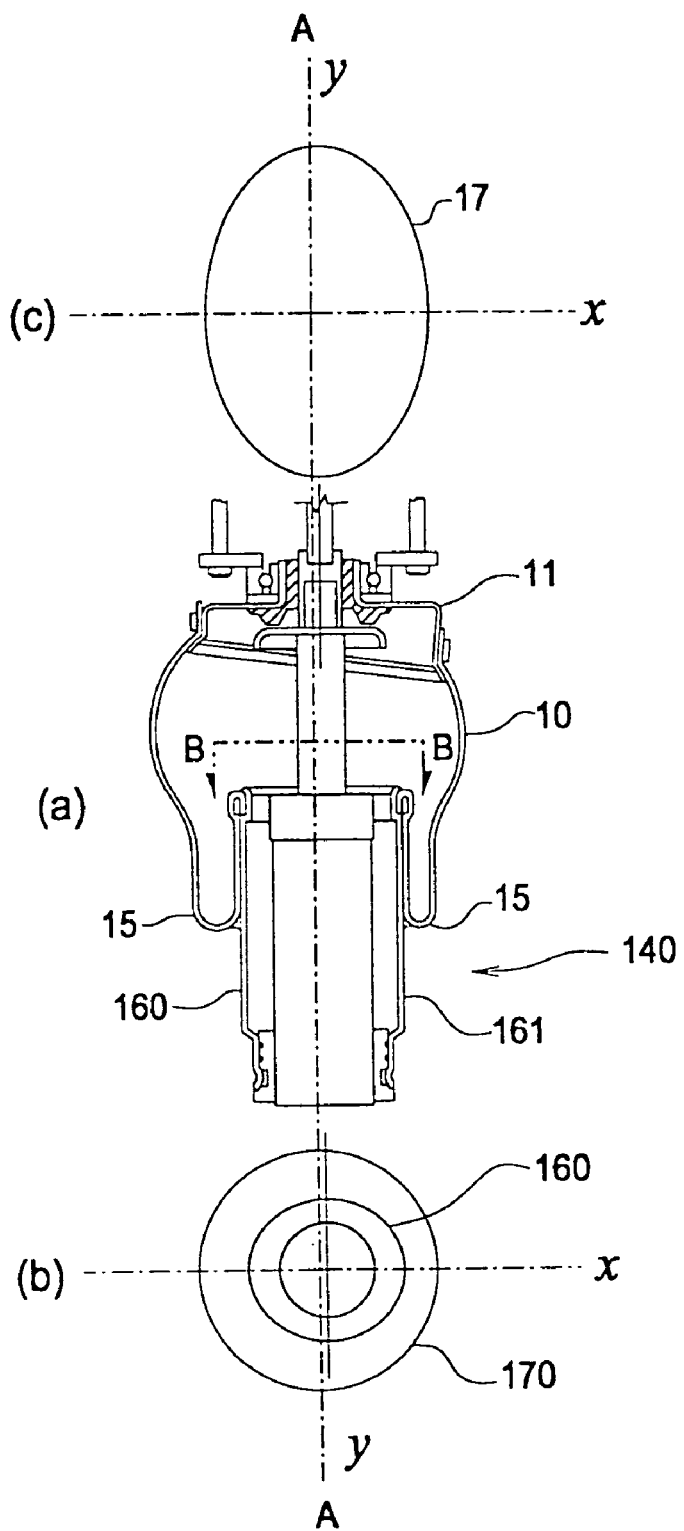
FIG. 2a is a cross-sectional view of an inventive piston.
FIG. 2b is a plan view of an inventive piston cross-section B—B, and sleeve uniform stress distribution.
FIG. 2c is a plan view of a sleeve elliptical stress distribution.

FIG. 2a is a cross-sectional view of an inventive piston. Piston 140 comprises outer surface 160. The other components are as described in FIG. 1a. Outer surface 160 describes a substantially elliptical shape when viewed along an axis A—A. Outer surface 160 may be an integral part of piston 140. Outer surface 160 may also comprise an outer shroud 161 that is attached to piston 140. FIG. 2a depicts an outer shroud 161 having an elliptical outer surface 160.

Sleeve 10 has an elliptical stress distribution due to the tilted end cap 11 as described elsewhere herein. FIG. 2c is a plan view of a sleeve elliptical stress distribution. The sleeve elliptical stress distribution has a major axis on the y-axis and a minor axis on the x-axis.

FIG. 2b is a plan view of an inventive piston cross-section B—B, and sleeve uniform stress distribution. The elliptical cross-section of outer surface 160 is rotated approximately 90° to the orientation of the elliptical stress distribution in the sleeve. Namely, the outer surface 160 has a major axis on the x-axis and the minor axis on the y-axis. As rolling lobe 15 is formed upon and rolls on outer surface 160, the elliptical stress distribution in sleeve 10 becomes substantially uniform or in the instant case, substantially circular 170. The uniform substantially circular stress distribution 170 in sleeve 10 significantly increases the durability of the sleeve. One can appreciate that the stress distribution may have a form other than circular and yet remain uniform.

A ratio between the major axis length and the minor axis length of outer surface 160 is selected in order to establish a substantially uniform, or in the instant example circular, stress distribution in sleeve 10. The ratio of the lengths of the major axis and minor axis is dependent upon the degree of side load compensation, namely end cap tilt θ. In a non-side load compensated air spring, a tilt angle θ of the end cap is zero and the ratio is 1.0—a circle. In the case of a side-load compensating air spring having an end cap tilt angle of approximately 12 degrees, the ratio is approximately 1.2.

By way of example and not of limitation, in a test a side-load compensating air spring sleeve was tested on an elliptical air spring piston having a ratio of approximately 1.08. The operating life of the tested sleeve was approximately five (5) times longer than the operating life of an identical sleeve mounted on a piston having a circular cross section. In this example, the end cap tilt angle θ was approximately seven (7) degrees.

Ratios for the inventive air spring piston are in the range of approximately 1.0 to 1.5 for end cap tilt angles θ in a range of approximately 0° to 20°. One can appreciate that the relationship between the ratio and the end cap tilt is not in all cases linear.

Although a single form of the invention has been described herein, it will be obvious to those skilled in the art that variations may be made in the construction and relation of parts without departing from the spirit and scope of the invention described herein.

What is claimed is:

1. An air spring comprising:
   a flexible sleeve having one end attached to an end member and the other end attached to a piston;
   the end member is tilted at an angle θ with respect to a piston major axis A—A in the range of approximately 7° to approximately 20°;
   the piston having an outer surface having only an elliptical cross-section;
   the outer surface comprising a ratio between a major axis length and a minor axis length of approximately 1.08;
   the flexible sleeve forming a rolling lobe cooperatively engaged with the outer surface; and
   the flexible sleeve engaged with the piston outer surface such that the flexible sleeve comprises a substantially circular stress distribution.

2. The air spring as in claim 1, wherein a major axis of a flexible sleeve stress distribution is disposed at approximately 90° to a major axis of the outer surface elliptical cross-section.

* * * * *